United States Patent [19]

Spreckelmeyer

[11] 4,078,047
[45] Mar. 7, 1978

[54] PRODUCTION OF HYDROFLUORIC ACID FROM PHOSPHATE-CONTAINING FLUORSPAR

[75] Inventor: Bernhard Spreckelmeyer, Johannesburg, South Africa

[73] Assignee: Bayer Aktiengesellschaft, Leverkusen, Germany

[21] Appl. No.: 755,902

[22] Filed: Dec. 30, 1976

[30] Foreign Application Priority Data

Jan. 17, 1976  Germany .............................. 2601654

[51] Int. Cl.$^2$ ...................... C01B 7/22; C01F 11/46
[52] U.S. Cl. ................................ 423/485; 423/488; 423/555
[58] Field of Search ................ 423/485, 488, 555

[56] References Cited

U.S. PATENT DOCUMENTS

| | | | |
|---|---|---|---|
| 1,665,588 | 4/1928 | Harshaw et al. | 423/485 |
| 3,017,246 | 1/1962 | Kamlet | 423/485 |
| 3,087,787 | 4/1963 | Flemmert | 423/485 X |
| 3,160,473 | 12/1964 | Hayworth et al. | 423/485 |
| 3,718,736 | 2/1973 | Watson et al. | 423/485 |

OTHER PUBLICATIONS

Book "A Course in Gen. Chem.,", 3rd Ed., 1927, by W. McPherson and W. E. Henderson, p. 601., Ginn & Co., N. Y.

Primary Examiner—Edward Stern
Attorney, Agent, or Firm—Burgess, Dinklage & Sprung

[57] ABSTRACT

In the reaction of phosphate-containing fluorspar with sulphuric acid to produce gaseous hydrofluoric acid, withdrawing the hydrofluoric acid and condensing it, the improvement which comprises adding to the fluorspar a reactive iron compound in an amount approximately equivalent to the phosphate content whereby the phosphate content of the condensed hydrofluoric acid is markedly diminished. The reactive iron compound can be contained in another fluorspar which is blended in the first fluorspar in the requisite amount and/or it can be an iron oxide, fluoride or sulphate, or a hydrated or hydratable iron compound added to the phosphate-containing fluorspar in about 0.2 to 5% by weight calculated as $Fe_2O_3$ content and based on the fluorspar.

2 Claims, No Drawings

PRODUCTION OF HYDROFLUORIC ACID FROM PHOSPHATE-CONTAINING FLUORSPAR

It is generally known to produce hydrofluoric acid from fluorspar and sulphuric acid.

In large-scale production of hydrofluoric acid from fluorspar and sulphuric acid, so-called acid grade calcium fluoride is employed which is recovered from ground ore, for example, by flotation. The acid grade calcium fluoride must meet the following requirements in order to ensure good processibility:

$CaF_2$: min. 97.0%
$SiO_2$: max. 1.0%
$CaCO_3$: max. 1.0%
Metal oxides: max. 0.2%
Sulphide-Sulphur: max. 0.01%
Flotation agent: max. 0.03%

It is becoming increasing difficult, however, to find fluorspar which is suitable for the production of acid grade calcium fluoride. This fluorspar is worked up by means of flotation or processes working on a similar basis; however, impurities other than those given in the above list cannot be removed by these purification processes or only to an unsatisfactory degree. These impurities include, for example, phosphate compounds for which reason working up of such phosphate-containing calcium fluoride deposits has hitherto been avoided. It was found namely that working up phosphate-containing fluorspar deposits resulted in the hydrofluoric acid and the by-product hexafluorosilicic acid containing amounts of phosphate. In the following the phosphate content is always given as $P_2O_5$ in percent by weight.

When working up acid grade calcium fluoride to form hydrofluoric acid, care is always taken that it should contain as little phosphate as possible; normally types of spar are processed in which $P_2O_5$ amounts to less than 0.01%. Since the main proportion of the phosphate contained in the fluorspar remains in the calcium sulphate (approximately 70%) during the production of hydrofluoric acid, the anhydrous hydrofluoric acid contains only traces of $P_2O_5$ (less than 0.001%), while approximately 0.005% of $P_2O_5$ is found in the by-product hexafluorosilicic acid ($H_2SiF_6$, approximately 30% strength solution).

If, however, a fluorspar is employed with a higher phosphate content, then the proportion of $P_2O_5$ in the anhydrous hydrofluoric acid and in the hexafluorosilicic acid rises very steeply indeed.

On employing a phosphate-containing fluorspar with 0.25% of $P_2O_5$, for example, the $P_2O_5$ content in the anhydrous hydrofluoric acid will be 0.01% and in the hexafluorosilicic acid it will even rise to as much as 0.25%. An amount of 0.01% of $P_2O_5$ in the anhydrous hydrofluoric acid represents, however, a degree of impurity no longer permissible in many fields of application. 0.25% of $P_2O_5$ in the hexafluorosilicic acid means that it cannot be employed, for example, directly as a raw material for the production of cryolite which in fact constitutes one of the main uses of hexafluorosilicic acid.

It is therefore the object of the present invention to find a process which permits the processing of phosphate-containing fluorspar to form hydrofluoric acid and hexafluorosilicic acid exhibiting a satisfactory degree of purity.

The present invention hence relates to a process for processing phosphate-containing fluorspar, characterized in that reactive iron compounds in an amount approximately equivalent to the $P_2O_5$ content are added to the phosphate-containing fluorspar.

Hitherto, addition of substances, such as, for example, iron oxides which are able to bind sulphate, was deliberately avoided. It was likewise not to be expected that under the prevailing reaction conditions phosphate would be bound by iron compounds. Surprisingly, it has now been found that addition of such reactive iron compounds prevents any appreciable amounts of $P_2O_5$ being taken along to the anhydrous hydrofluoric acid and to the hexafluorosilicic acid. Even when using fluorspar with for example 0.2% of $P_2O_5$, a hydrofluoric acid with less than 0.001% of $P_2O_5$ was obtained in accordance with the process of the invention.

In order to effect binding of the phosphate it will be sufficient in general to add the reactive iron compounds in amounts approximately equivalent to the amount of phosphate present. Depending on the quality of the fluorspar employed, about 0.2 to 5% of reactive irom compounds (calculated on their $Fe_2O_3$ content) are added, based on the fluorspar employed.

Even higher amounts of reactive iron compounds may be used without detrimental effect to the process. However, an excessive amount of additive will presumably not be advisable for economic reaons, since the additives will bind sulphate to a greater degree.

In view of the hitherto discovered fluorspar deposits, which contain phosphate, the addition of reactive iron compounds should preferably lie in the range of 0.5 to 3%, calculated on their $Fe_2O_3$ content, based on the fluorspar employed.

In the case of fluorspar having a high content of phosphate it may be advisable to blend it with iron-containing acid grade calcium fluoride or alternatively with fluorspar having a lower phosphate content; this permits the addition of smaller amounts of reactive iron-containing compounds than when just fluorspar is used with a higher level of phosphate. The reactive iron-compounds are added to the mixture or a reactant prior to the main reaction. These additives are added to the fluorspar after the flotation process or another processing step, e.g. prior to or during drying or during the initial reaction with the sulphuric acid. The reactive iron compounds, however, can also be added to the sulphuric acid or to the sulphuric acid containing sulphur trioxide. Possible reactive iron compounds are for example: iron oxides, iron fluorides, iron sulphates, in addition all compounds or mixtures which contain at least in part acid soluble iron, as long as they do not contain any ions of detriment to the reaction. There may also be employed in accordance with this process, hydrated iron compounds, e.g. hydroxides or hydrated oxides or compounds containing water of crystallization; in this instance a corresponding amount of sulphur trioxide is added to the sulphuric acid.

A variation of the process consists in adding an amount of iron-containing fluorspar to the fluorspar with a higher level of phosphate such that the $P_2O_5$ content of the latter corresponds to the iron content of the former. Reactive iron compounds or acid grade calcium fluorides can be optionally added to the first fluorspar depending on its iron content. The necessity of making such an addition may be easily established by performing a laboratory analysis of the fluorspar which contains iron.

The working up of phosphate-containing hexafluorosilicic acid from the production of fertilizers to form synthetic fluorspar has become more and more important of late. The synthetic fluorspar recovered in this way, however, as a rule still contains phosphate. In accordance with the process of the invention it can now be directly used to produce hydrofluoric acid or hexafluorosilicic acid.

The process of the invention will now be explained in greater detail with reference to the following examples:

EXAMPLE 1

1.3% of $Fe_2O_3$ were mixed with a fluorspar having a $P_2O_5$ content of 0.23%. The reaction with a feeding acid ($H_2O$-HF-containing $H_2SO_4$) took place in a rotary kiln. The HF-crude gases left the kiln at a temperature of approximately 200° C and were washed with sulphuric acid, cooled with liquid HF and finally condensed. The anhydrous HF contained 0.0007% of $P_2O_5$ and the hexafluorosilicic acid contained 0.001% of $P_2O_5$. Practically the entire amount of phosphate left the kiln together with the reacted calcium sulphate.

EXAMPLE 2

Fluorspar with a $P_2O_5$ content of 0.1% was reacted with feeding acid in a rotary kiln. The feeding acid was added prior to introduction of iron sulphate heptahydrate in an amount such that 0.4 kg of $FeSO_4 \cdot 7 H_2O$ per 100 kg of calcium fluoride were present in the mixture. The hydrogen fluoride formed in the condensation space contained 0.002% of $P_2O_5$.

EXAMPLE 3

1 kg of fluorspar, which contained 0.27% of $P_2O_5$, was mixed with 10.5 g of hydrated iron fluoride in a heatable mixer. The iron fluoride, a waste product from a steel pickling plant, contained 30% of iron. Thereafter, feeding acid was continuously metered in doses at 200° to 250° C to the fluorspar and hydrogen fluoride condensed out of the escaping gas by means of carbon dioxide snow. The non-condensible part was washed with aqueous hydrofluoric acid. 0.005% of $P_2O_5$ was detected in the condensed hydrogen fluoride, 0.0007% in the washing solution.

COMPARISON EXAMPLE 3a

Work was performed according to the experimental procedure described in Example 3 using the same fluorspar but without previous addition of iron fluoride. The condensed hydrogen fluoride contained 0.04% of $P_2O_5$.

In all of the foregoing instances the recitations of percentages had reference to weight unless otherwise expressed.

It will be appreciated that the instant specification and examples are set forth by way of illustration and not limitation, and that various modifications and changes may be made without departing from the spirit and scope of the present invention.

What is claimed is:

1. In the reaction of phosphate containing fluorspar with with an acid to produce gaseous hydrofluoric acid, withdrawing the hydrofluoric acid and condensing it, the improvement which comprises adding to the fluorspar a reactive iron compound comprising at least one member selected from the group consisting of an iron oxide, iron fluoride and iron sulphate in about 0.2 to 5% by weight calculated as $Fe_2O_3$ content and based on the fluorspar and in an amount approximately equivalent to the phosphate content whereby the phosphate content of the condensed hydrofluoric acid is markedly diminished.

2. In the reaction of phosphate containing fluorspar with an acid to produce gaseous hydrofluoric acid, withdrawing the hydrofluoric acid and condensing it, the improvement which comprises adding to the fluorspar a second fluorspar containing a reactive iron component, the second fluorspar being added in an amount such that the total amount of reactive iron component is approximately equivalent to the phosphate content whereby the phosphate content of the condensed hydrofluoric acid is markedly diminished.

* * * * *